United States Patent [19]

Salgado et al.

[11] Patent Number: 5,600,762
[45] Date of Patent: Feb. 4, 1997

[54] METHOD OF PROCESSING A JOB, IN A PRINTING SYSTEM, WITH A COMPOSITE JOB TICKET

[75] Inventors: David L. Salgado, Victor; Kevin F. Aubertine, Ontario; Dennis B. Ulrich, Fairport; Robert L. Sklut, Rochester; Jennifer L. Betit, Fairport; Samuel D. Ambalavanar, Rochester, all of N.Y.

[73] Assignee: Xerox Corporation, Stamford, Conn.

[21] Appl. No.: 315,273

[22] Filed: Sep. 29, 1994

[51] Int. Cl.⁶ .................................................. G06F 3/12
[52] U.S. Cl. ........................................ 395/114; 395/101
[58] Field of Search ........................... 395/100, 101, 395/109, 114, 118, 148, 115, 117, 600; 358/539, 540, 401, 444, 448, 468, 452, 296; 364/931, 931.43; 355/202, 204

[56] References Cited

U.S. PATENT DOCUMENTS

| | | | |
|---|---|---|---|
| 3,597,071 | 7/1971 | Jones | 355/3 |
| 4,821,107 | 4/1989 | Naito et al. | 358/256 |
| 5,021,892 | 6/1991 | Kita et al. | 358/468 |
| 5,047,955 | 9/1991 | Shope et al. | 364/519 |
| 5,079,723 | 1/1992 | Herceg et al. | 395/156 |
| 5,126,858 | 6/1992 | Kurogune et al. | 358/440 |
| 5,170,340 | 12/1992 | Prokop et al. | 364/143 |
| 5,175,633 | 12/1992 | Sato et al. | 358/406 |
| 5,223,948 | 6/1993 | Sakurai et al. | 358/404 |
| 5,260,805 | 11/1993 | Barrett | 358/449 |
| 5,271,065 | 12/1993 | Roarke et al. | 382/1 |
| 5,276,799 | 1/1994 | Rivshin | 395/162 |
| 5,301,262 | 4/1994 | Kashiwagi | 395/117 |
| 5,307,458 | 4/1994 | Freiburg et al. | 395/162 |
| 5,361,134 | 11/1994 | Hu et al. | 358/442 |
| 5,436,430 | 7/1995 | Hube | 358/444 |
| 5,450,571 | 9/1995 | Roseurans et al. | 345/112 |

FOREIGN PATENT DOCUMENTS

| | | |
|---|---|---|
| 479494A2 | 4/1992 | European Pat. Off. . |
| 52-9808A2 | 3/1993 | European Pat. Off. . |
| 1531401 | 11/1978 | United Kingdom . |

*Primary Examiner*—Edward L. Coles, Sr.
*Assistant Examiner*—Gabriel I. Garcia
*Attorney, Agent, or Firm*—Gary B. Cohen

[57] ABSTRACT

A method of processing a job, with compound segments, in a printing system is provided. The method includes the steps of (a) generating a dialog, having a set of attributes designating a manner in which compound segments of the job are to be processed by the printing system, and (b) programming the dialog so that values are provided for selected ones of the set of attributes. The method further includes the steps of (c) capturing the attribute values, programmed in step (b), to obtain a job ticket for a first one of the compound segments and (d) repeating steps (a) –(c) for one or more other compound segments to create a composite job ticket. The compound segments are then processed, in accordance with the composite job ticket, so that one or more copies of the job are delivered to one or more output/storage destinations.

10 Claims, 11 Drawing Sheets

METHOD OF PROCESSING A JOB, IN A PRINTING SYSTEM, WITH A COMPOSITE JOB TICKET

BACKGROUND OF THE INVENTION

The present invention relates generally to a technique for processing a job, with multiple compound segments, in a printing system and, more particularly, to a method for creating a composite job ticket and processing the multiple compound segments in accordance therewith.

Electronic printing systems typically include an input section, sometimes referred to as an input image terminal ("IIT"), a controller, sometimes referred to as an electronic subsystem ("ESS") and an output section or print engine, sometimes referred to as an image output terminal ("IOT"). In one type of electronic printing system, manufactured by Xerox® Corporation, known as the DocuTech® electronic printing system, a job can be inputted to the IIT from, among other sources, a network or a scanner. An example of an IIT with both network and scanner inputs is found in the following patent, the pertinent portions of which are incorporated herein by reference:

U.S. Pat. No. 5,170,340

Patentees: Prokop et al.

Issued: Dec. 8, 1992

When a scanner is employed to generate the job, image bearing documents are scanned so that the images therein are converted to image data for use in making prints. When a network is used to generate the job, a stream of data, including various job related instructions and image data, expressed in terms of a page description language is captured, decomposed and stored for printing. As is known, a network job can have its origin in a remote client, such as a workstation, or a print server with a storage device. Jobs provided at the IIT may be stored in a memory section, sometimes referred to as "electronic precollation memory". An example of electronic precollation memory may be found in the following patent:

U.S. Pat. No. 5,047,955

Patentees: Shope et al.

Issued: Sep. 10,1991

U.S. Pat. No. 5,047,955 discloses a system in which input image data of a job is rasterized and compressed. The compressed, rasterized image data is then stored, in collated form, in a job image buffer. Once the job has been stored in the job image buffer, a selected number of job copies can be decompressed and printed without further job rasterization.

In one area related to electronic printing, namely digital copying, a demand for "multifunctionality" continues to grow. As illustrated by the following patent, a multifunctional digital copier can assume the form of an arrangement in which a single electrostatic processing printer is coupled with a plurality of different image input devices, with such devices being adapted to produce image related information for use by the printer.

U.S. Pat. No. 3,957,071

Patentee: Jones

Issued: Jul. 27, 1971

U.S. Pat. No. 3,957,071 discloses that the image related information, in one example, could have its origin in video facsimile signals, microfilm, data processing information, light scanning platens for full size documents, aperture cards and microfiche.

The following patents also relate to the area of multifunctional digital copying:

U.S. Pat. No. 4,821,107

Patentees: Naito et al.

Issued: Apr. 11, 1989

U.S. Pat. No. 5,021,892

Patentees: Kita et al.

Issued: Jun. 4, 1991

U.S. Pat. No. 5,175,633

Patentees: Saito et al.

Issued: Dec. 29, 1992

U.S. Pat. No. 5,223,948

Patentees: Sakurai et al.

Issued: Jun. 29, 1993

U.S. Pat. No. 5,276,799

Patentee: Rivshin

Jan. 4, 1994

U.S. Pat. No. 5,307.458

Patentees: Freiburg et al.

Issued: Apr. 26, 1994

U.S. Pat. No. 4,821,107 discloses a multifunctional image apparatus which is operable in one of various office automation modes, such as copy mode, facsimile mode, printer mode and the like. The multifunctional imaging apparatus is comprised of an image reading section, an image forming section and a communication section for transmitting and receiving image data.

U.S. Pat. No. 5,175,633 and U.S. No. 5,307,458, respectively, disclose systems that exploit a coprocessor to access, among others, facsimile and communication functions. In the latter of these patents, a plurality of input/output devices reside on a common bus with a video processor, with the video processor using an electronic precollation scheme. In the '458 patent, a first set of image data is processed in the video processor while a second set of image data is buffered in the coprocessor. An arbiter permits the coprocessor to have the bus, for a selected interval, to process the second set of image data in the video processor.

U.S. Pat. No. 5,276,799 discloses a multi-bus printing system in which multiple tasks can be performed at any one moment in time. More particularly, a group of intelligent modules is in communication with a CBus, DBus and VBus, respectively, while a CPU processing module is in communication with the CBus and a DMA processing module is in communication with the DBus. One feature of this multi-bus printing system is that it provides a high level of concurrency. For example, in one embodiment three separate sets of data can be substantially concurrently transferred across the CBus, DBus and VBus.

Digital copiers typically seek to optimize concurrency and/or multi-tasking in operation. Xerox' DocuTech® optimizes multitasking by using a plurality of processors to operate individual services, such as scanning, printing, storing and decomposing, simultaneously. Accordingly, in one example, a document can be scanned while another document is being printed. Even though this sort of multitasking is desirable, it requires a substantial amount of both processing capability and storage space. A printing system, with an architecture of substantially smaller scale than DocuTech®, may be found in the following patent:

British Patent 1,531,401

Patentees: Davy et al.

Publication Date of Complete Specification: Nov. 8, 1976

British Patent 1,531,401 discloses a system with a bus to which an input section, precollation memory and an output section are operatively coupled. Each of the input section and the output section includes a set of buffers and a direct memory access (DMA) interface. One DMA interface serves to transfer a first set of buffered data from one of the input buffers to the precollation memory while another DMA interface serves to transfer a second set of data from the precollation memory to one of the output buffers. Another patent that uses an architectural concept similar to that of the '401 British patent can be found in the following reference:

U.S. Pat. No. 5,301,262

Patentee: Kashiwagi

Issued: Apr. 5,1994

The '262 patent, in contrast to the '401 British patent, compresses image data, prior to storing it in a page buffer, and decompresses the image data, prior to outputting it.

Programming a job is often achieved with a "job ticket". For many printing systems, the job ticket is provided in the form of one or more programmable dialogs, each programmable dialog including values which are selected with a user interface, such as the user interface found in a DocuTech® printing system manufactured by Xerox Corporation. Job tickets can vary dramatically in both structure and functionality. In one instance, the job ticket may assume the form of a relatively simple dialog displayed on a liquid crystal display ("LCD"). Attributes of a corresponding job, such as desired image processing, designated stock and finishing characteristics may be displayed for setting of suitable output values, e.g., stock size.

Since the programming for a job can be relatively complex, it is often desirable to provide a plurality of job tickets, corresponding with a plurality of frames. In practice, each dialog relates to the programming of a set of job attributes, such as stock characteristics. The following patent relates to a technique in which multiple job tickets may be used to program a job:

U.S. Pat. No. 5,079,723

Patentees: Herceg et al.

Issued: Jan. 7, 1992

U.S. Pat. No. 5,079,723 discloses a touch dialog user interface for programming a reproduction machine through use of a touch control CRT screen with a display for providing a message area, user interface state selections, and plural tapped file folders. Each file folder, when opened, in turn, displays a smaller card file of tabbed cards with an adjacent work area. Each card in the card file, when opened, provides a display of icons representing first level machine programming selections for touch selection. Each icon, when touched, displays further icons representing second level programming selections in the work area for touch selection.

At least some of the basic concepts of U.S. Pat. No. 5,079,723 have been incorporated into the DocuTech® Printing System. The following references, among others, relate to the multiple job ticket scheme of the DocuTech Printing System.

U.S. Pat. No. 5,260,805

Patentee: Barrett

Issued: Nov. 9, 1993

Now allowed U.S. patent application Ser. No. 08/093,845 (a divisional application of U.S. Pat. No. 5,271,065)

Applicants: Rourke et al.

Filed: Sep. 28, 1990

U.S. Pat. No. 5,260,805 discloses an electronic printing system with a touch screen for programming print jobs using job tickets displayed on the screen. The job tickets have various job programming choices together with scaled representations of a print image superimposed on selected print media, and a control for comparing the size of the print image, as originally oriented with the maximum image size. A full message is displayed on the screen, in the event that the print image size exceeds the system maximum image size, even though the print image as displayed fits into the print media.

Now Allowed U.S. patent application Ser. No. 08/093,845 discloses a technique for printing a signature job, i.e., a job resulting in a plurality of sheets being imaged on signature print media sheets, in a selected order for creating a booklet. A plurality of job tickets are employed to program the signature job. In one aspect of the technique, lay-out work for the signatures to be produced is performed with a job ticket in which a gutter and margins are programmably set for each pair of electronic sheets on one side of an electronic signature sheet.

Certain versions of the DocuTech® printing system can be coupled operatively with one or more network clients by way of a DocuTech Network Server. A multiple job ticket scheme adapted for use in a Network DocuTech® Printing System is disclosed in the following pending patent application:

U.S. patent application Ser. No. 07/752,155

Applicants: Rosekrans et al.

Filed: Aug. 29, 1991

The Network Printing System of the '155 application includes a print server having a plurality of print queues mapped with one or more mask files. Each of the queues communicates with one or more workstations and upon selecting one of the print queues with a selected workstation a mask file associated with the selected print queue is communicated to a job ticket processing circuit. An inter-client job ticket, which represents all of the attributes of all of the printers associated with the print queues is combined with the associated mask file to obtain a user interface dialog job ticket, which user interface dialog job ticket is displayed at the selected workstation. The user interface dialog job ticket displays the attributes of the printer associated with the selected print queue.

Various ones of the above references relating to job tickets describe the use of multiple tickets to describe multiple aspects of a single job copy. More particularly, each time a user programs a job for a given output, values are selected from one or more tickets to describe the input/output attributes of a job copy. When the user desires to program a job for a plurality of outputs, a set of one or more job tickets is developed for each designated output. Moreover, when certain attributes, such as stock size, are varied for a given job, multiple sets of one or more job tickets may be required. For a job with a wide variety of attributes and a relatively large number of intended output destinations, it is necessary, with the multiple job ticket schemes of the above-described references to create a relatively large number of individual job ticket sets. Management of such large number of job ticket sets can become cumbersome for a print machine operator, particularly when not all of the job ticket sets are programmed at the same time. It would be desirable to provide a scheme in which a plurality of job copies could be programmed with an integrated ticket so that even a large number of job ticket sets could be managed as one convenient set.

The pertinent portions of each of the above-discussed references is incorporated herein by reference.

SUMMARY OF THE INVENTION

In accordance with one aspect of a disclosed embodiment of the present invention, there is provided a method of processing a job, with a job ticket, in a printing system with a user interface for programming the job with a selected input, the printing system being associated with output/storage destinations, each output/storage destination including an output device or a memory location, the job being represented by a first compound segment and a second compound segment with each compound segment corresponding with the selected input and one of the output/storage destinations, including the steps of: (a) generating a dialog having a set of attributes, the set of attributes designating a manner in which one of first compound segment and the second compound segment are to be processed by the printing system; (b) programming the dialog, with the user interface, so that values are provided for selected ones of the set of attributes; (c) capturing the attribute values, programmed in the step (b), to obtain a job ticket for the one of the first compound segment and the second compound segment; (d) repeating steps (a)–(c) for the other one of the first compound segment and the second compound segment to create a composite job ticket; and (e) processing both the first compound segment and the second compound segment, in accordance with the composite job ticket, so that one or more copies of the job are delivered to one or more of the output/storage destinations.

In accordance with another aspect of a disclosed embodiment of the present invention, there is provided a method of processing a job, with a job ticket, in a printing system with a user interface for programming the job with a selected input, the printing system being associated with output/storage destinations, each output/storage destination including an output device or a memory location, the job being represented by a first compound segment and a second compound segment with each compound segment corresponding with the selected input and one of the output/storage destinations, comprising the steps of: (a) generating a dialog having a set of attributes, the set of attributes designating a manner in which one of first compound segment and the second compound segment is to be processed by the printing system; (b) programming the dialog, with the user interface, so that values are provided for selected ones of the set of attributes; (c) capturing the attribute values, programmed in said step (b), to obtain a job ticket for the one of the first compound segment and the second compound segment; (d) creating a composite ticket including the job ticket obtained with said capturing step; (e) storing the created composite in a memory location; (f) at a time subsequent to said step (e), repeating steps (a)–(c) for the other one of the first compound segment and the second compound segment; (g) supplementing the composite job ticket with the job ticket for the other one of the first compound segment and the second compound segment; and (h) processing both the first compound segment and the second compound segment, in accordance with the composite job ticket, so that one or more copies of the job are delivered to one or more of the output/storage destinations.

These and other aspects of the invention will become apparent from the following description, the description being used to illustrate a preferred embodiment of the invention when read in conjunction with the accompanying drawings.

DETAILED DESCRIPTION OF PREFERRED EMBODIMENTS

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 1:
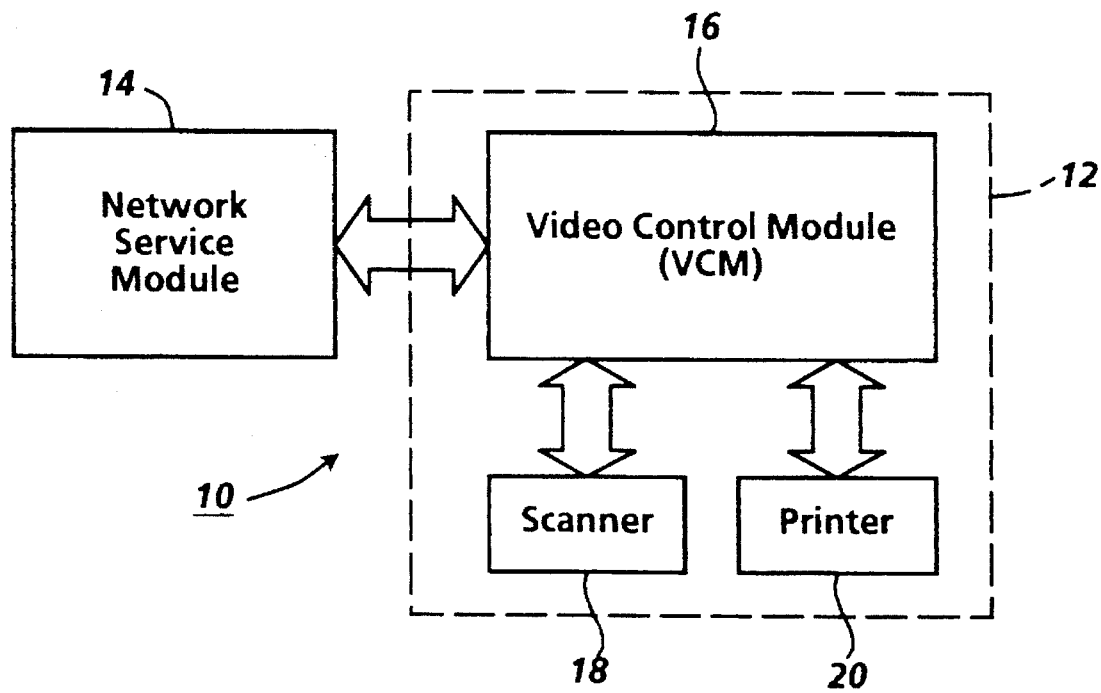
FIG. 1 is a block diagram depicting a multifunctional, network adaptive printing machine.

Referring to FIG. 1, a multifunctional, network adaptive printing system is designated by the numeral 10. The printing system 10 includes a printing machine 12 operatively coupled with a network service module 14. The printing machine 12 includes an electronic subsystem 16, referred to as a video control module (VCM), communicating with a scanner 18 and a printer 20. In one example, the VCM 16, which will be described in further detail below, coordinates the operation of the scanner and printer in a digital copying arrangement. In a digital copying arrangement, the scanner 18 (also referred to as image input terminal (IIT)) reads an image on an original document by using a CCD full width array and converts analog video signals, as gathered, into digital signals. In turn, an image processing system 22 (FIG. 2), associated with the scanner 18, executes signal correction and the like, converts the corrected signals into multi-level signals (e.g. binary signals), compresses the multi-level signals and preferably stores the same in electronic precollation (EPC) memory 24.

Referring again to FIG. 1, the printer 20 (also referred to as image output terminal (IOT)) preferably includes a xerographic print engine. In one example, the print engine has a multi-pitch belt (not shown) which is written on with an imaging source, such as a synchronous source (e.g. laser raster output scanning device) or an asynchronous source (e.g. LED print bar). In a printing context, the multi-level image data is read out of the EPC memory 24 (FIG. 2) while the imaging source is turned on and off, in accordance with the image data, forming a latent image on the photoreceptor. In turn, the latent image is developed with, for example, a hybrid jumping development technique and transferred to a print media sheet. Upon fusing the resulting print, it may be inverted for duplexing or simply outputted. It will be appreciated by those skilled in the art that the printer can assume other forms besides a xerographic print engine without altering the concept upon which the disclosed embodiment is based. For example, the printing system 10 could be implemented with a thermal ink jet or ionographic printer.

Figure 2:
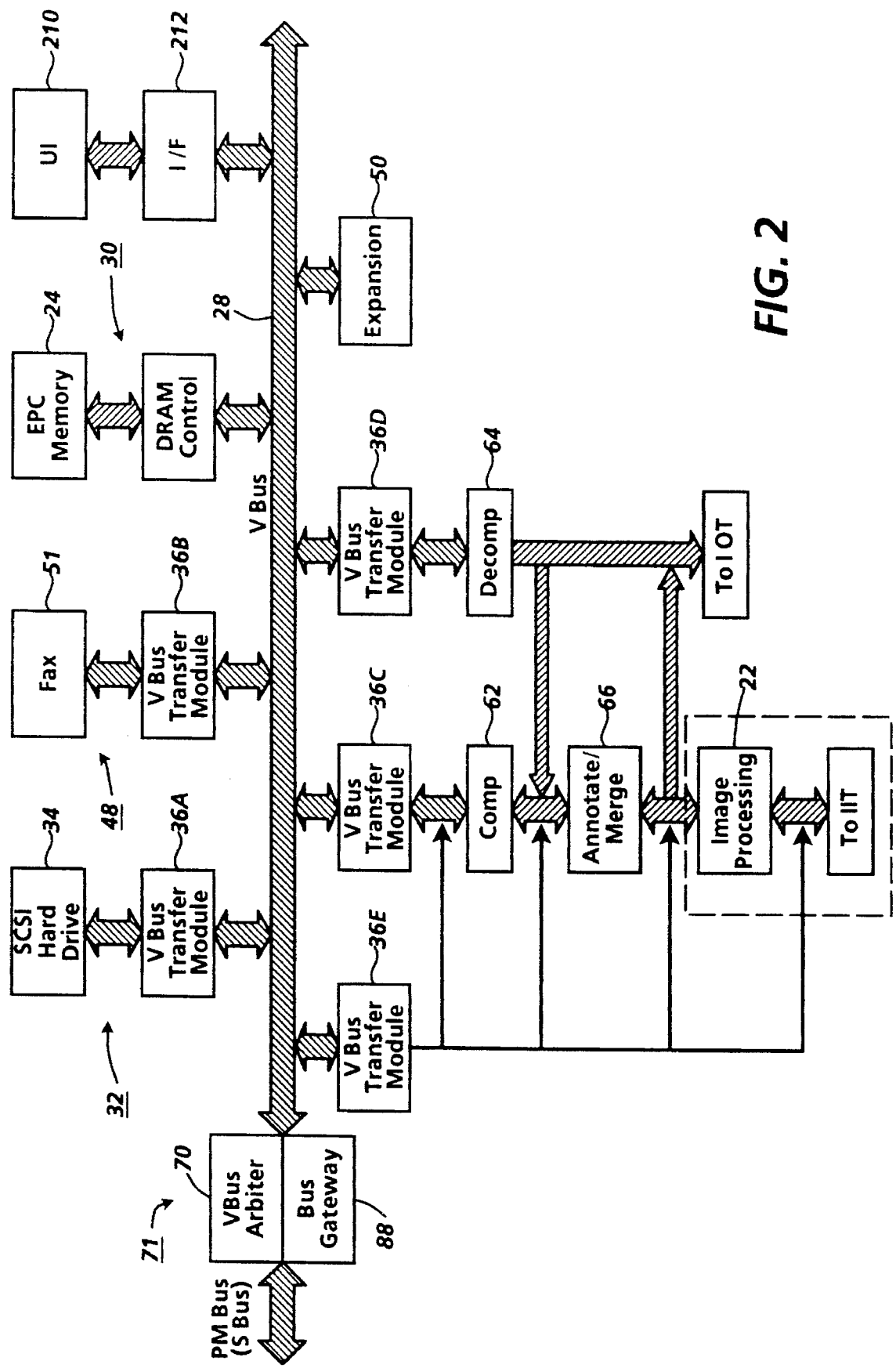
FIG. 2 is a block diagram of a video control module for the printing machine of FIG. 1.

Referring specifically to FIG. 2, the VCM 16 is discussed in further detail. The VCM 16 includes a video bus (VBus) 28 with which various I/O, data transfer and storage components communicate. Preferably, the VBus is a high speed, 32 bit data burst transfer bus which is expandable to 64 bit. The 32 bit implementation has a sustainable maximum bandwidth of approximately 60 MBytes/sec. In one example, the bandwidth of the VBus is as high as 100 MBytes/sec.

The storage components of the VCM reside in the EPC memory section 30 and the mass memory section 32. The EPC memory section includes the EPC memory 24, the EPC memory being coupled with the VBus by way of a DRAM controller 33. The EPC memory, which is preferably DRAM, provides expansion of up to 64 MBytes, by way of two high density 32 bit SIMM modules. The mass memory section 32 includes a SCSI hard drive device 34 coupled to the VBus by way of a transfer module 36a. As will appear, other I/O and processing components are coupled respectively to the VBus by way of transfer modules 36. It will be appreciated that other devices (e.g. a workstation) could be coupled to the VBus by way the transfer module 36a through use of a suitable interface and a SCSI line.

Figure 3:
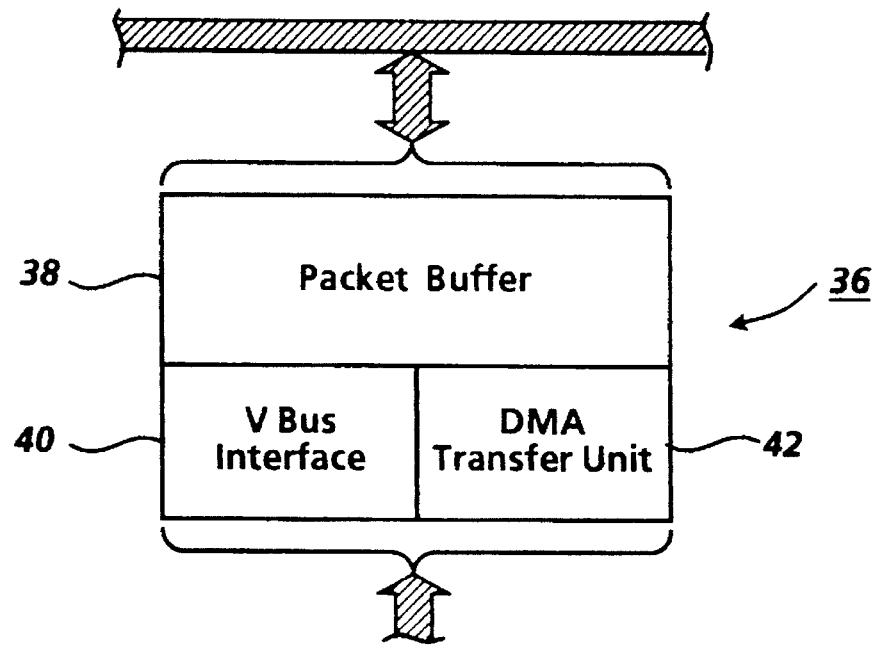
FIG. 3 is a block diagram of a transfer module used in conjunction with the printing machine of FIG. 2.

Referring to FIG. 3, the structure of one of the transfer modules 36 is discussed in further detail. The illustrated transfer module of FIG. 3 includes a packet buffer 38, a VBus interface 40 and DMA transfer unit 42. The transfer module 36, which was designed with "VHSIC" Hardware Description Language (VHDL), is a programmable arrangement permitting packets of image data to be transmitted along the VBus at a relatively high transfer rate. In particular, the packet buffer is programmable so that the segment or packet can be varied according to the available bandwidth of the VBus. In one example, the packet buffer can programmed to handle packets of up to 64 Bytes Preferably, the packet size would be reduced for times when the VBus is relatively busy and increased for times when activity on the bus is relatively low.

Figure 5:
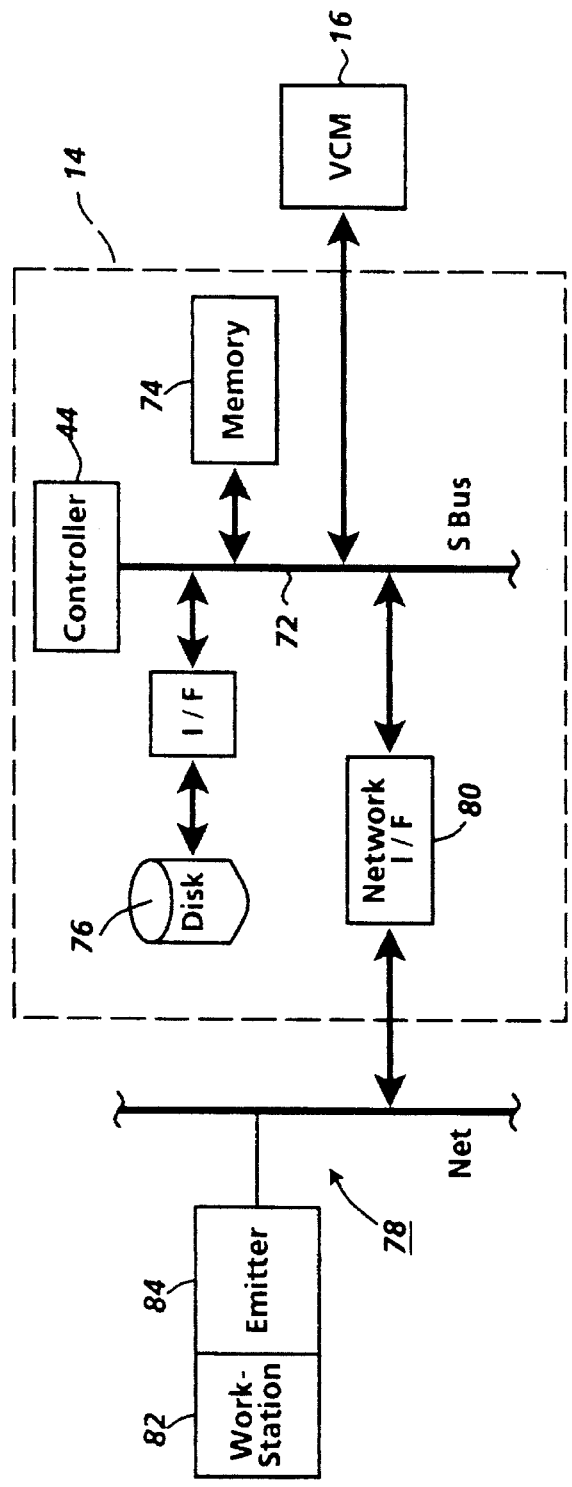
FIG. 5 is a block diagram of a network controller for the printing machine of FIG. 1.

Adjustment of the packet size is achieved with the VBus interface 40 and a system controller 44 (FIG. 5). Essentially, the VBus interface is an arrangement of logical components, including, among others, address counters, decoders and state machines, which provides the transfer module with a selected degree of intelligence. The interface 40 communicates with the system controller to keep track of desired packet size and, in turn, this knowledge is used to adjust the packet size of the packet buffer 38, in accordance with bus conditions. That is, the controller, in view of its knowledge regarding conditions on the VBus 28, passes directives to the interface 40 so that the interface can adjust packet size accordingly. Further discussion regarding operation of the transfer module 36 is provided below More particularly, each imageThe DMA transfer unit employs a conventional DMA transfer strategy to transfer the packets. In other words, the beginning and end addresses of the packet are used by the transfer unit in implementing a given transfer. When a transfer is complete, the interface 40 transmits a signal back to the system controller 44 so that further information, such as desired packet size and address designations, can be obtained.

Figure 4:
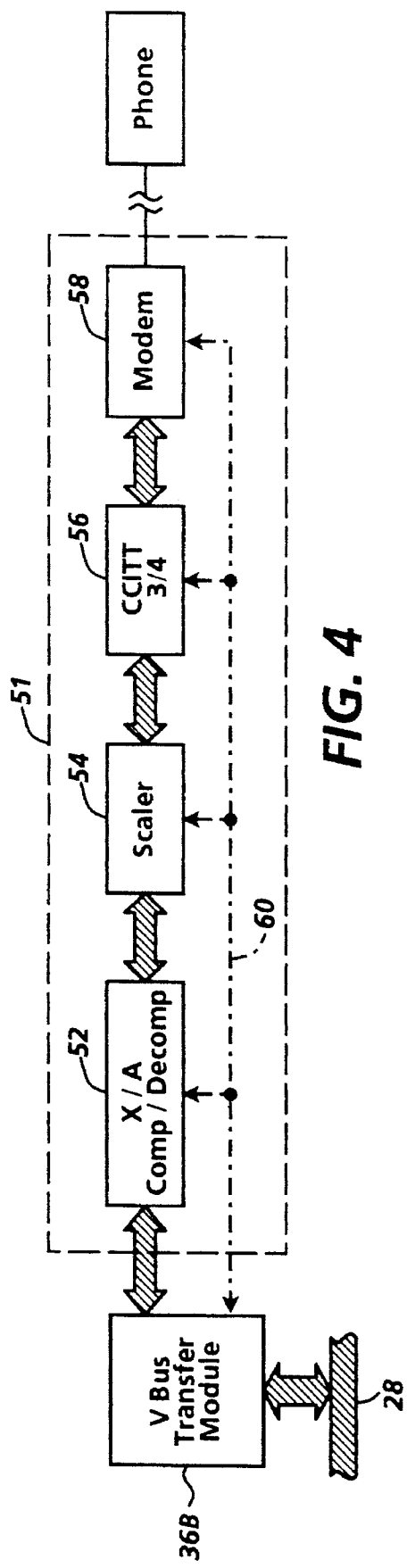
FIG. 4 is a block diagram of a facsimile card used in conjunction with the printing machine of FIG. 2.

Referring to FIGS. 1 and 2, three I/O components are shown as being coupled operatively to the VBus 28, namely a FAX module 48, the scanner or IIT 18, and the printer or IOT 20; however, it should be recognized that a wide variety of components could be coupled to the VBus by way an expansion slot 50. Referring to FIG. 4, an implementation for the FAX module, which is coupled to the VBus 28 by way of transfer module 36b, is discussed in further detail. In the preferred embodiment, a facsimile device (FAX) 51 includes a chain of components, namely a section 52 for performing Xerox adaptive compression/decompression, a section 54 for scaling compressed image data, a section 56 for converting compressed image data to or from CCITT format, and a modem 58, preferably manufactured by Rockwell Corporation, for transmitting CCITT formatted data from or to a telephone, by way of a conventional communication line.

Referring still to FIG. 4, each of the sections 52, 54 and 56 as well as modem 58 are coupled with the transfer module 36*b* by way of a control line 60. This permits transfers to be made to and from the FAX module 48 without involving a processor. As should be understood, the transfer module 36*b* can serve as a master or slave for the FAX module in that the transfer module can provide image data to the FAX for purposes of transmission or receive an incoming FAX. In operation, the transfer module 36*b* reacts to the FAX module in the same manner that it would react to any other I/O component. For example, to transmit a FAX job, the transfer module 36*b* feeds packets to the section 52 through use of the DMA transfer unit 42 and, once a packet is fed, the transfer module transmits an interrupt signal to the system processor 44 requesting another packet. In one embodiment, two packets are maintained in the packet buffer 38 so that "ping-ponging" can occur between the two packets. In this way, the transfer module 36*b* does not run out of image data even when the controller cannot get back to it immediately upon receiving an interrupt signal.

Referring again to FIG. 2, the IIT 18 and IOT 20 are operatively coupled to the VBus 28 by of transfer modules 36*c* and 36*d*. Additionally, the IIT 18 and the IOT 20 are operatively coupled with a compressor 62 and a decompressor 64, respectively. The compressor and decompressor are preferably provided by way of a single module that employs Xerox adaptive compression devices. Xerox adaptive compression devices have been used for compression/decompression operations by Xerox Corporation in its DocuTech® printing system. In practice, at least some of the functionality of the transfer modules is provided by way of a 3 channel DVMA device, which device provides local arbitration for the compression/decompression module.

As further illustrated by FIG. 2, the scanner 18, which includes the image processing section 22, is coupled with an annotate/merge module 66. Preferably the image processing section includes one or more dedicated processors programmed to perform various desired functions, such as image enhancement, thresholding/screening, rotation, resolution conversion and TRC adjustment. The selective activation of each of these functions can be coordinated by a group of image processing control registers, the registers being programmed by the system controller 44. Preferably, the functions are arranged along a "pipeline" in which image data is inputted to one end of the pipe, and image processed image data is outputted at the other end of the pipe. To facilitate throughput, transfer module 36*e* is positioned at one end of the image processing section 22 and transfer module 36*c* is positioned at another end of the section 22. As will appear, positioning of transfer modules 36*c* and 36*e* in this manner greatly facilitates the concurrency of a loopback process.

Referring still to FIG. 2, arbitration of the various bus masters of the VCM 16 is implemented by way of a VBus arbiter 70 disposed in a VBus arbiter/bus gateway 71. The arbiter determines which bus master (e.g. FAX module, Scanner, Printer, SCSI Hard Drive, EPC Memory or Network Service Component) can access the VBus at one given time. The arbiter is made up of two main sections and a third control section. The first section, i.e., the "Hi-Pass" section, receives input bus requests and current priority selection, and outputs a grant corresponding to the highest priority request pending. The current priority selection input is the output from the second section of the arbiter and is referred to as "Priority Select". This section implements priority rotation and selection algorithm. At any given moment, the output of the logic for priority select determines the order in which pending requests will be serviced. The input to Priority Select is a register which holds an initial placement of devices on a priority chain. On servicing requests, this logic moves the devices up and down the priority chain thereby selecting the position of a device's next request. Control logic synchronizes the tasks of the Hi-Pass and the Priority Select by monitoring signals regarding request/grant activity. It also prevents the possibility of race conditions.

Referring to FIG. 5, the network service module 14 is discussed in further detail. As will be recognized by those skilled in the art, the architecture of the network service module is similar to that of a known "PC clone". More particularly, in the preferred embodiment, the controller 44, which preferably assumes the form of a SPARC processor, manufactured by Sun Microsystems, Inc., is coupled with a standard SBus 72. In the illustrated embodiment of FIG. 5, a host memory 74, which preferably assumes the form of DRAM, and a SCSI disk drive device 76 are coupled operatively to the SBus 72. While not shown in FIG. 5, a storage or I/O device could be coupled with the SBus with a suitable interface chip. As further shown in FIG. 5, the SBus is coupled with a network 78 by way of an appropriate network interface 80. In one example, the network interface includes all of the hardware and software necessary to relate the hardware/software components of the controller 44 with the hardware/software components of the network 78. For instance, to interface various protocols between the network service module 14 and the network 78, the network interface could be provided with, among other software, Netware® from Novell Corp.

In one example, the network 78 includes a client, such as a workstation 82 with an emitter or driver 84. In operation, a user may generate a job including a plurality of electronic pages and a set of processing instructions. In turn, the job is converted, with the emitter, into a representation written in a page description language, such as PostScript. The job is then transmitted to the controller 44 where it is interpreted with a decomposer, such as one provided by Adobe Corporation. Some of the principles underlying the concept of interpreting a PDL job are provided in U.S. application Ser. No. 07/898,761 entitled "Apparatus and Method for Multi-Stage/Multi-Process Decomposing", filed on Jun. 12, 1992, by Bonk et al., and U.S. Pat. No. 5,226,112 to Mensing et al., the pertinent portions of both references being incorporated herein by reference. Further details regarding a technique for generating a job in a PDL may be obtained by reference to the following text, the pertinent portions of which are incorporated herein by reference:

PostScript® Language Reference Manual

Second Edition

Addison-Wesley Publishing Co.

1990

Referring again to FIG. 2, the network service module 14 is coupled with the VCM 16 via a bus gateway 88 of the VBus arbiter/bus gateway 71. In one example, the bus gateway comprises a field programmable gate array provided by XILINX corporation. The bus gateway device provides the interface between the host SBus and the VCM VBus. It provides VBus address translation for accesses to address spaces in the VBus real address range, and passes a virtual address to the host SBus for virtual addresses in the host address range. A DMA channel for memory to memory transfers is also implemented in the bus gateway. Among other things, the bus gateway provides seamless access between the VBus and SBus, and decodes virtual addresses from bus masters, such as one of the transfer modules 36, so that an identifier can be obtained from a corresponding slave component. It will be appreciated by those skilled in the art that many components of the printing system 10 are implemented in the form of a single ASIC.

Referring to FIGS. 2, 3 and 5, further discussion regarding DMA transfer of each of the transfer modules 36 is provided. In particular, in one example, the images of a job are stored in the host memory 74 as a series of blocks. Referring to FIG. 19, a series of blocks is shown as being stored in the EPC memory 24. Preferably, each block comprises a plurality of packets. In operation, one of the transfer modules 36 is provided, by the controller 44, with the beginning address of a block and the size of the block. In turn, for that block, the transfer module 36 effects a packet tranfer and increments/decrements a counter. This procedure is repeated for each packet of the block until the interface 40 determines, by reference to the counter, that the last packet of the block has been transferred. Typically, for each stored image, several blocks are transferred, in a packet-by-packet manner, as described immediately above.

Referring to FIGS. 2, and 5–7, one aspect of operation of the above described printing system is discussed. In particular, FIGS. 6 and 7 relate to an advantageous manner in which the transfer modules 36 are employed to facilitate a loopback approach for image processing of jobs which are captured at a location other than the scanner 18. In the illustrated embodiment of FIG. 6, a job is captured in the network service module 14 (step 90). This is not to imply, however, that the loopback operation could not be performed, with equal facility, on a job captured at another location, such as the FAX module 48. Upon capturing the network job, it is either spooled in, for example, the SCSI disk 76 for eventual decomposition (steps 92, 94) or decomposed with the controller 44 for storage in the host memory 74 (steps 92, 96). If the process branches to step 94, a return is encountered. Accordingly, functions are performed, relative to other jobs, until the system is ready to decompose the spooled job. When it is time to decompose the spooled job, processing of the spooled job will resume at step 96.

Assuming that the job is decomposed, and image processing is required by the job, one or more transfer modules 36 are programmed, via step 98, for transferring electronic pages of the job to one or more destinations. It should be appreciated that, in one example, it may be desirable to program transfer module 36e for transferring an electronic page to the image processing section 22 and to program transfer module 36c for transferring the resulting image processed electronic page to EPC memory 24. It will be appreciated that other ones of the transfer modules could be programmed in a manner that would enhance system concurrency. For example, in the case where the image processed electronic page is transferred to EPC memory, the transfer module 36a could be programmed to spool a copy of the image processed electronic page in the SCSI disk 34.

At step 100, it is determined whether a current electronic page requires image processing. Initially, this determination would be made for a first page of the job. Assuming that the current electronic page does not require image processing, it is determined, at step 102, whether the current electronic page is to be transferred to a location other than the host memory 74. In one example, it may be desired to transfer the electronic page to the EPC memory 24 for eventual output (at, for example, the printer 20 or the facsimile device 51) or storage (in the SCSI disk 34). If the current page is to be transferred, then step 104 is executed, otherwise, the process proceeds to step 106 (FIG. 7) so that further electronic pages can be, if necessary, image processed and/or transferred (step 107).

Assuming that the current electronic page is to be image processed (FIG. 6), the image processing section 22 is set up, via step 108, to perform one or more selected image processing operations on a selected electronic page. In response to setting up appropriate image processing control registers, at step 108, the current electronic page is transferred, with the transfer module 36e, to the image processing section 22 (step 110) and, at step 112, one or more programmed image processing operations are performed on the current electronic page. Upon completion of the image processing operations, it is determined, at step 114, whether the image processed electronic page should be transferred to storage (e.g. EPC memory 24 or host memory 74) or an output device (e.g. printer 20 or FAX module 48).

If the current electronic page is to be stored, then a decision is made, at step 118 (FIG. 7), as to whether the current electronic page is to be stored. For the most part, the printing system compresses the current electronic page, to promote efficient storage, unless a print of the current electronic page is to be produced. Indeed, even when printing a job, the corresponding electronic pages are often compressed and then stored in the EPC memory for "print readiness". With this approach a selected number of job copies can be printed without capturing/processing the job more than once. In some instances, however, it may be desirable to produce a single print from a current electronic job. For example, a single print may be produced for purposes of proofing. If compression is required, then the current electronic page is passed to the compressor 62, at step 120, otherwise, a storage destination of the current electronic page is determined directly, at step 122.

Figure 6:
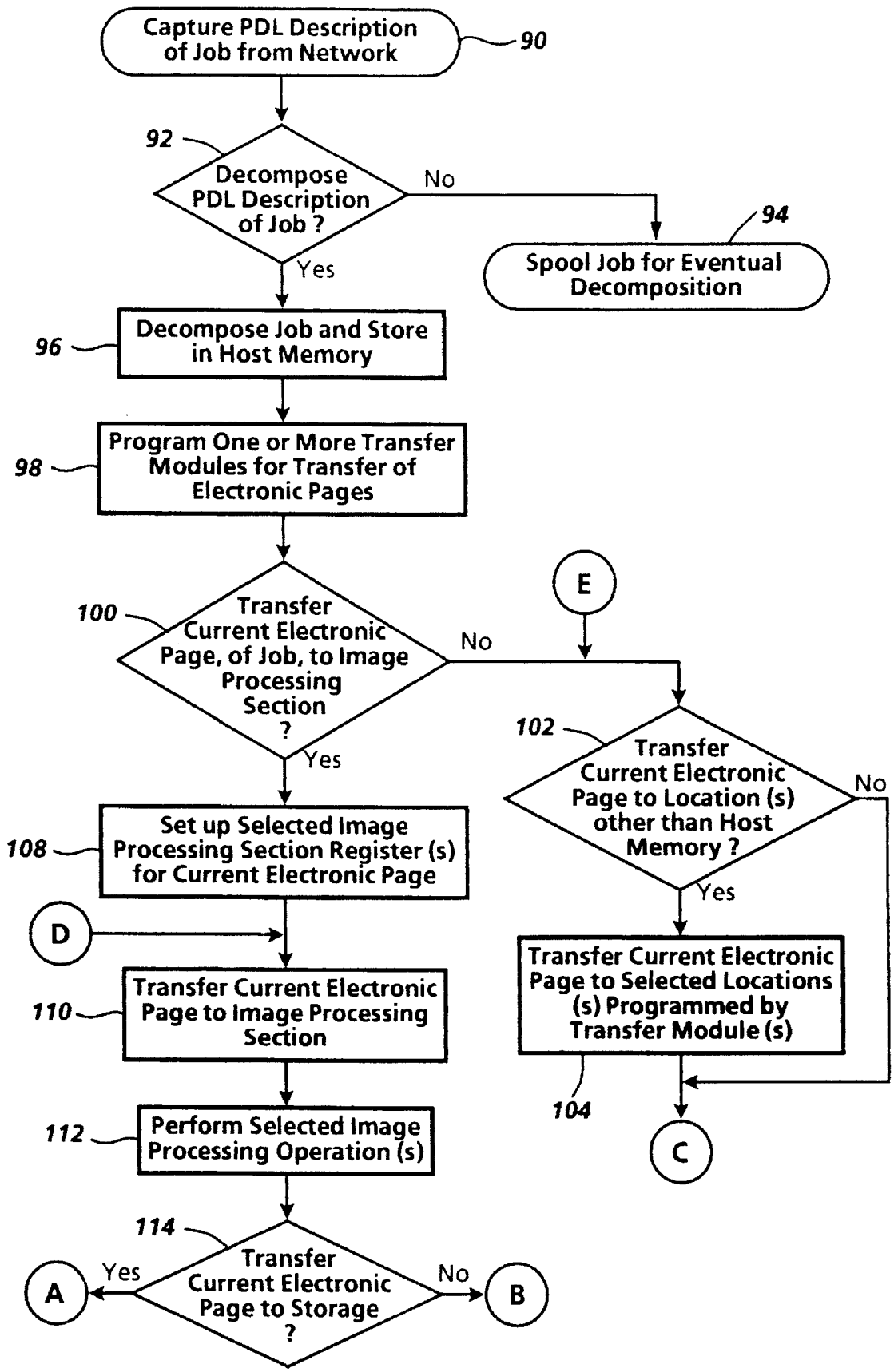
FIGS. 6 and 7 represent a flow diagram for a loopback image processing method of the present invention.
Figure 7:
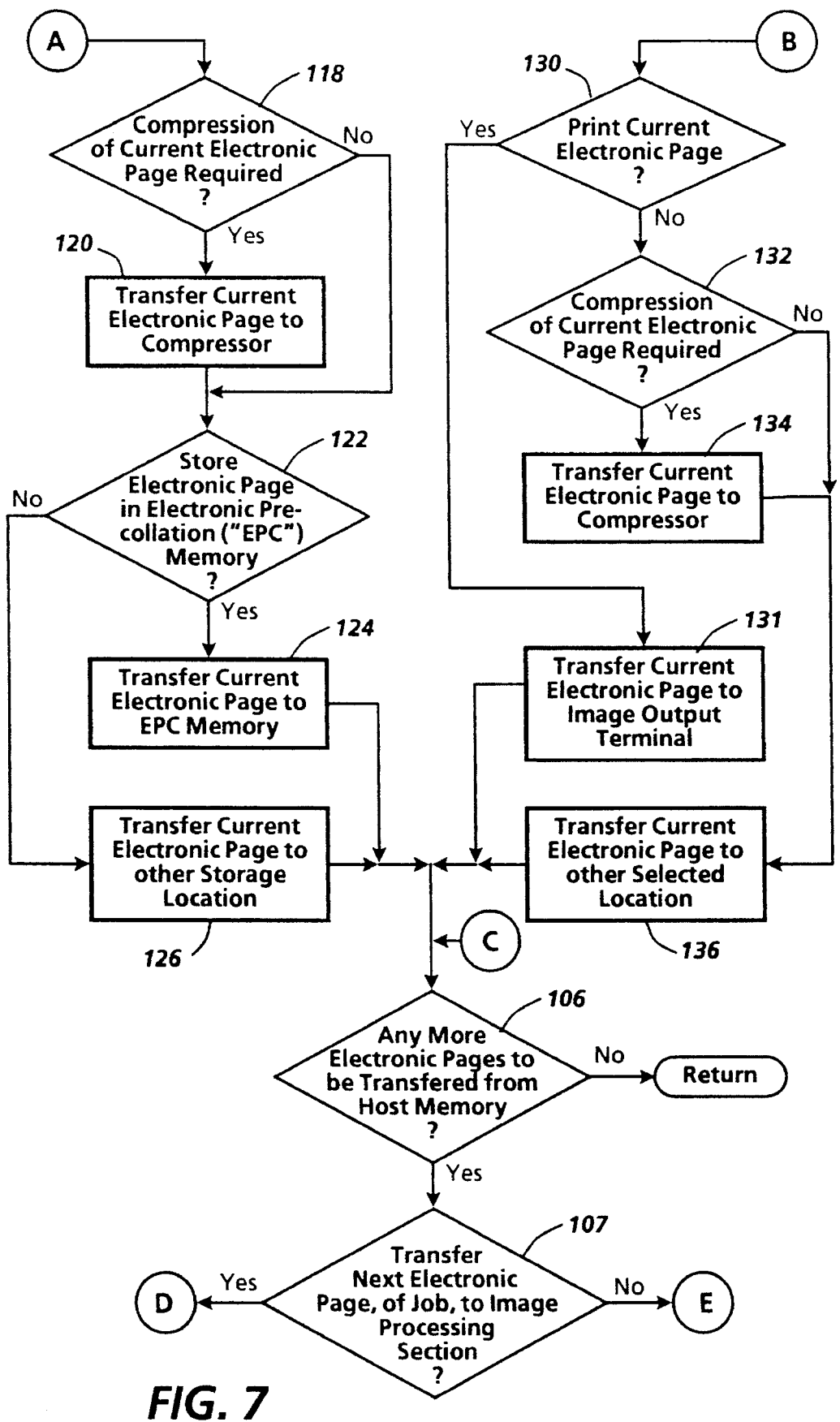

If the decision at step 122 is in the positive, then the process proceeds to step 124, where the current electronic page is transferred to the EPC memory, and then to step 106, where a check is made to determine if any more electronic pages exist, for the job, in the host memory 74. If the decision at step 122 is in the negative, then the current electronic page is transferred to a designated storage location other than the EPC memory (step 126), such as the host memory 74, and the process proceeds to step 106. Assuming that the current electronic page is not going to be stored, it is determined, at step 130, whether the current electronic page is to be printed. If the current electronic page is to be printed, then the same is transferred to the printer 20 for marking (step 131), otherwise, it is determined, at step 132, whether the current electronic page is to be compressed. As mentioned above, if an electronic page is not printed, then, typically, it is compressed. Assuming compression is required, the process proceeds to step 134, otherwise a transfer of the current electronic page to another location is performed directly at step 136. In either case, the process proceeds eventually to step 106. If all of the electronic pages in the host memory have been read, then the routine of FIGS. 6 and 7 is ended through a return. If, on the other hand, more pages need be transferred, then the process proceeds to step 107 where a next current electronic page is either processed or, if necessary, transferred away from host memory to another storage location or an output device.

Figure 8:
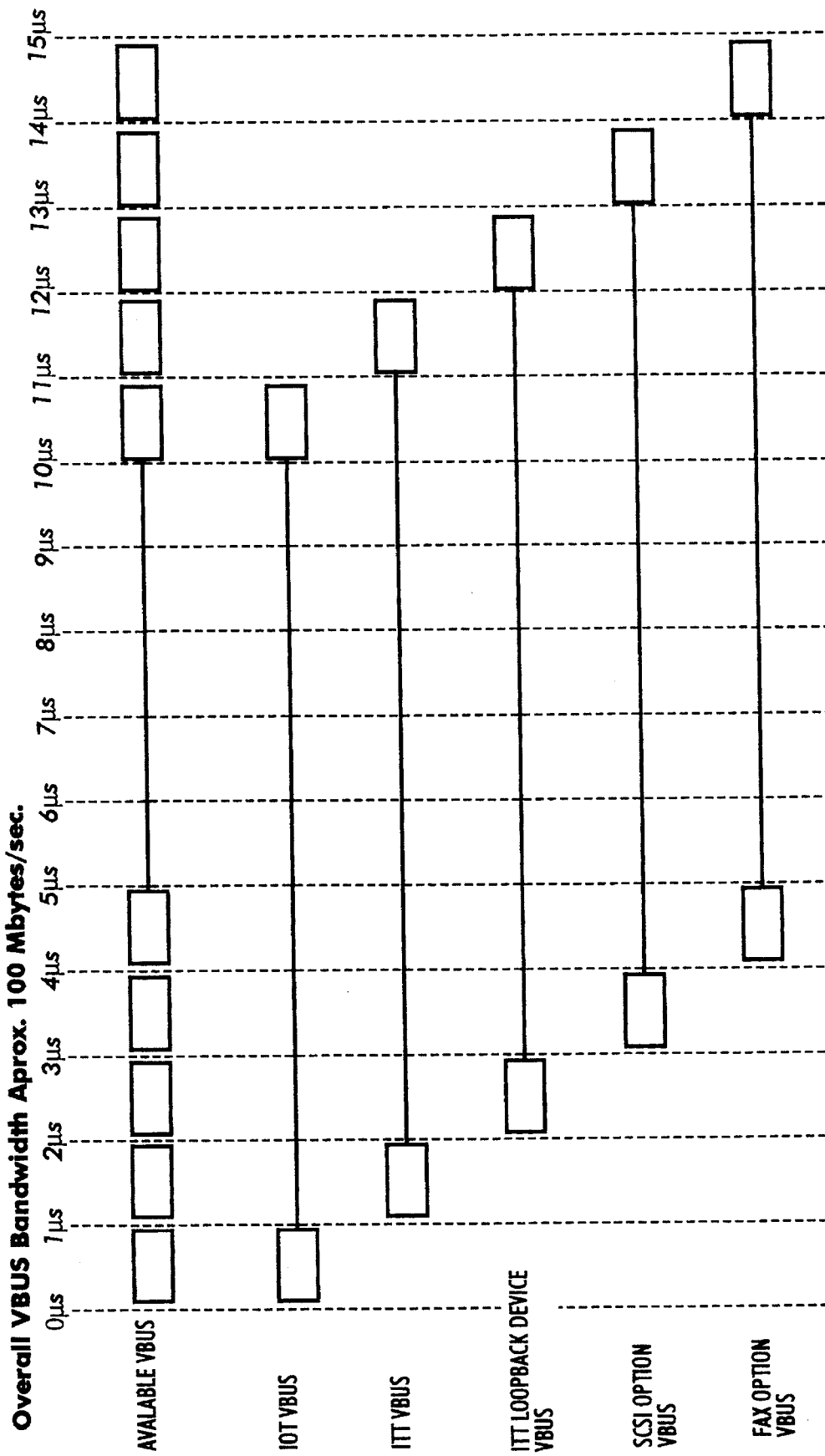
FIG. 8 is a timing diagram depicting a manner in which a plurality of bus masters can share a video bus, of the printing machine of FIG. 1, in a time-shared manner.

Referring to FIG. 8, another aspect of operation of the above described printing system is discussed. The illustrated timing diagram of FIG. 8 shows how each bus master on the Vbus 28 shares the available bandwidth by time multiplexing the high speed bus and sending a fragment of a job or image file every time the bus master has access to the bus. Each time one of the bus masters receives a grant of the bus, via the arbiter 70, the bus master sends a packet of information on the bus while it continues to receive data from its respective interface. Packet sizes are programmable in sizes ranging from 4 bytes to 64 bytes per packet. In the example of FIG. 8, each device requires approximately 10 Mbytes/sec of bandwidth from the Vbus. When bus masters, each having a bandwidth requirement of 10 Mbytes/sec, are concurrently using the bus, the total bandwidth used on the bus is 50 Mbytes/sec. This leaves approximately 50 Mbytes/sec available bandwidth left on the bus. The remaining bus bandwidth can be used by any other bus masters wishing to transfer data on the Vbus. The large amount of available bandwidth also eliminates any contention problems which can arise with an over-utilized bus.

Referring to both FIGS. 2 and 8, it will be appreciated that the above-described multiplexing permits at least two jobs to be processed within a relatively brief time interval. For all intents and purposes, it would appear to a printing system user that the jobs were being operated on simultaneously. More specifically, a first job could be stored in the EPC memory 24 and a second job could be stored in the host memory 74. As soon as an image data packet of the second job is buffered in the packet buffer of transfer module 36e, a packet of image data from the first job can be delivered to the printer 20, by use of transfer module 36d, concurrently with image data being delivered to the image processing section 22. As will be further appreciated, by reference to FIG. 8, copies of packets of the first job could be delivered to various other bus masters in a time-sharing or multiplexed fashion.

Figure 9:
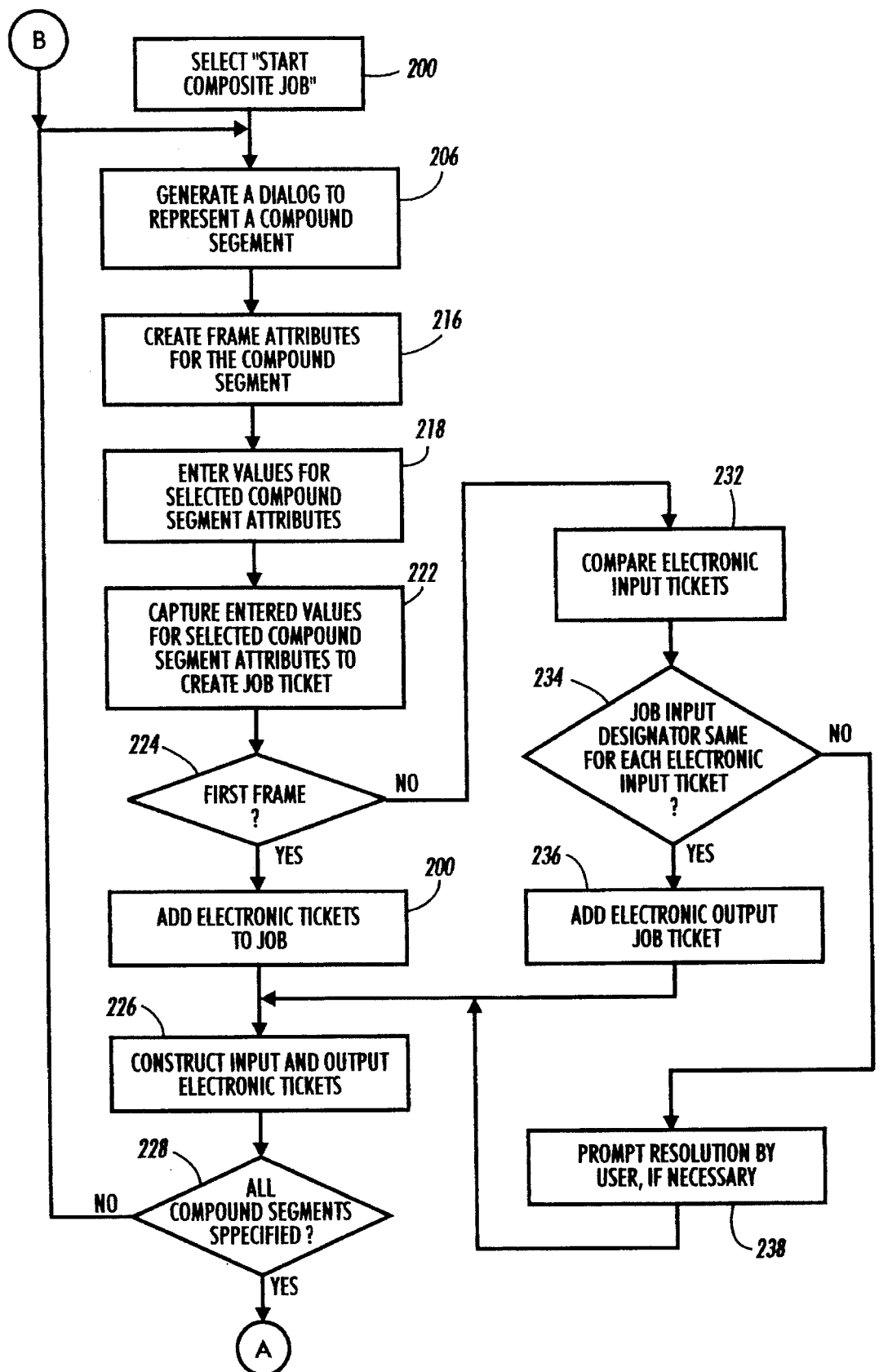
FIG. 9 is a flow diagram illustrating a first embodiment of developing a composite job ticket.
Figure 10:
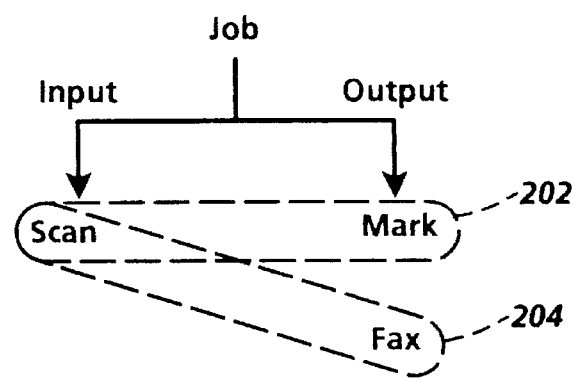
FIG. 10 is a schematic depiction of a job with two compounds.

Referring to FIG. 9, a technique for generating a composite job ticket is discussed. At step 200, the programming of a composite job ticket is initiated. Preferably, the composite job ticket is formed from one or more "compound segments". Referring to FIG. 10, a compound segment is defined, herein, as each pair of input/output designations used to describe the processing of a job. In the illustrated embodiment of FIG. 10, two compound segments, namely compound segment 202 and compound segment 204, are shown. As will be explained in further detail below, the current embodiment contemplates that, for a given job, the input aspect of each compound remains constant.

Figure 11:
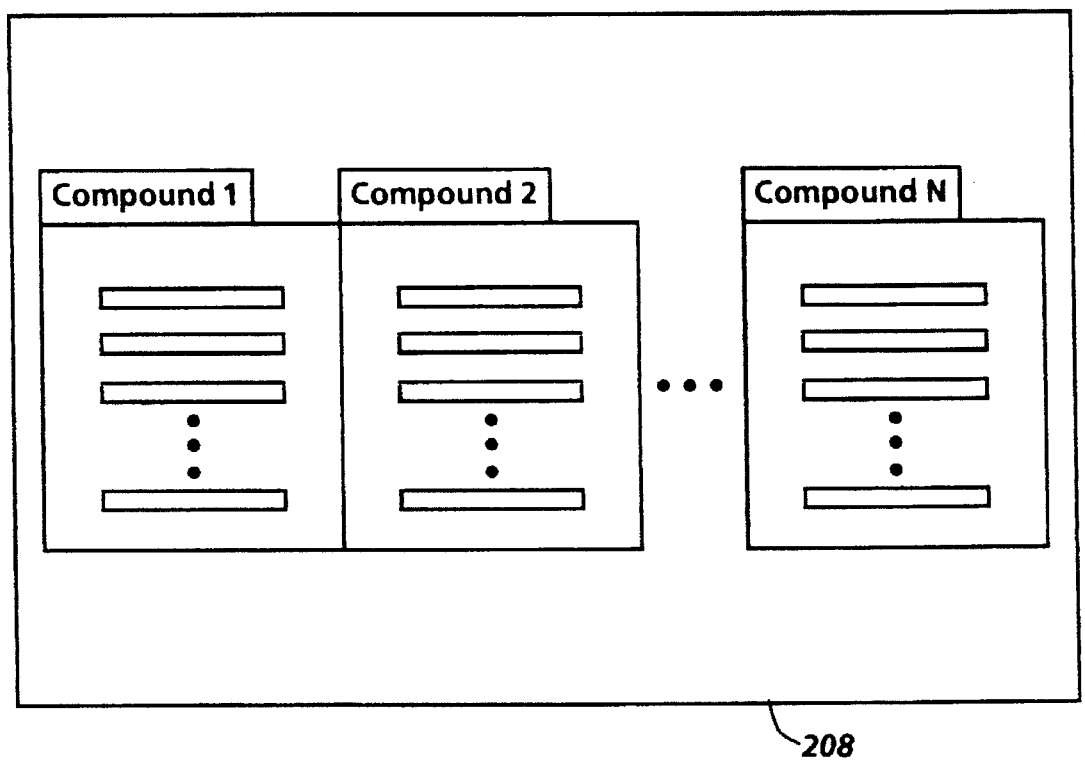
FIG. 11 is a display screen with a plurality of frames respectively configured as compounds, each compound including a plurality of attributes.

Referring again to FIG. 9, at step 206, a dialog, representing a single compound segment, is generated. As will appear, for a preferred composite ticket, multiple compounds will be formed. Referring to FIG. 11, as each compound segment is generated, it will appear on a screen 208, the screen residing on a user interface ("UI") 210 (FIG. 2), the user interface being coupled with the VBus 28 by way of a suitable UI interface 212. Any suitable UI, such as the UI used with the DocuTech® printing system, would be appropriate for use as UI 210. Each compound segment includes one or more frame attributes, each frame attribute being shown in a compound card as a blank rectangle. As is known, a job attribute refers to a job characteristic, such as a stock characteristic (e.g. stock size). The attributes serve as directives for the printing system 10 indicating the manner in which a job copy is inputted and/or outputted.

Referring again to FIG. 9, frame attributes are created for a selected compound segment (step 216) and values for those attributes are, via step 218, entered with the UI 210. In one example, a value would include the degree to which a portion of a job copy is to be edited, e.g. "cropped". Through use of the controller 44 (FIG. 5), the values of the selected compound segment are, via step 220, captured. It will be understood that for each compound segment or frame, two tickets, namely an input ticket and an output ticket, are programmed to provide suitable information to the printing system regarding the input/output attributes of the job. For the first programmed frame (step 222), the electronic input and output job tickets are, at step 224, added to the job and, at step 226, the values are set for the attributes to construct input and output electronic job tickets. If further compound segments are to be specified (step 228), then the process loops back to step 206, otherwise, the process process to a checking routine of FIG. 12. It will be appreciated that each of the electronic tickets are linked or coupled to one another by way of an appropriate referencing scheme, such as a link list. While, in the preferred embodiment, the electronic tickets are maintained in a link list, in other contemplated embodiments parallelism may be facilitated by placing the electronic tickets in an array.

Referring again to step 222, if the frame being programmed is not the first frame, then a conflict check is performed. As will appear, the conflict check insures that only one input is programmed for the job. At step 232, a comparison is performed between the various programmed input tickets of the job. It is then determined, at step 234, whether the job input designator of each programmed input ticket is the same. If the input designators are all the same, then the currently programmed output job ticket is, via step 236, added to the job. On the other hand, in the illustrated embodiment of FIG. 9, if a conflict exists between the input designators, then the process, at step 238, prompts the user to resolve the conflict.

Figure 12:
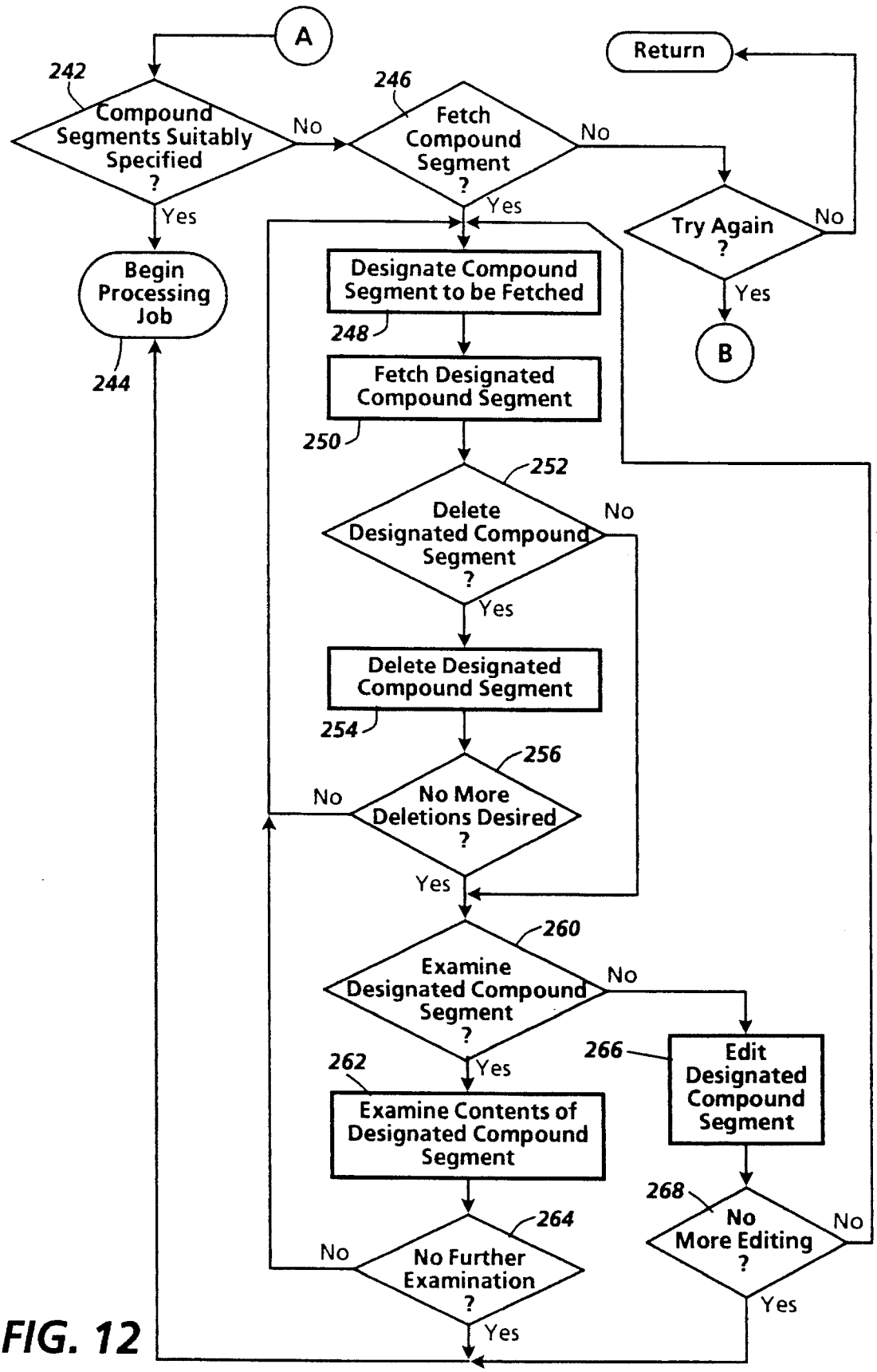
FIGS. 12 is a flow diagram illustrating various functions that can be performed on a programmed composite job ticket.

Referring to FIG. 12, after the composite job ticket has been programmed, by way of the routine of FIG. 9, a user is provided with an opportunity to modify the programmed composite job ticket in various ways. At step 242, a check is performed to determine if the user wishes to make any modifications prior to processing the job. If the compound segments are all suitably specified, from the user's point of view, the job is then processed (step 244). In one example, the job is processed, with the scanner 18 (FIG. 2) and queued in EPC memory 24 for subsequent output to multiple destinations. If the user desires to make further modifications, then the process proceeds to step 246.

At step 246, the user may indicate that a modification (or examination) is desired. In this event a compound segment to be fetched is designated (step 248) and the compound segment is fetched from one of the printing system memory sections (step 250). Once the designated compound segment is fetched, a decision is made, at step 252, as to whether it is to be deleted. If deletion is required, a deletion is performed at step 254 and a check is made, at step 256, as to whether another deletion is desired. If another deletion is desired, then the process loops back to step 248, otherwise the process proceeds to step 260 where a determination regarding examination is made.

If the user desires to examine a designated compound segment, then an examination opportunity is afforded at step 262. If further examination is required (step 264), then the process loops back to step 248 so that another compound segment can be fetched. If the user decides, at 260, not to examine the fetched compound segment, then the process is routed to step 266 where editing capability is provided. Editing can be achieved with a number of suitable graphics packages. If further editing is required (step 268), then the process loops back to step 248 where another compound segment is fetched.

Assuming that no further examination or editing is required (step 264 or 268) then processing of the job is begun at step 244. On the other hand, if the user decides, at step 246 that a new composite job ticket is to be composed, in place of the one just programmed, then the programming process can, by way of a positive decision at step 270, be reentered at step 206 (FIG. 9). At step 270, however, the user may decide to abort, which, in such case, a return to a main program, would be initiated.

Figure 13:
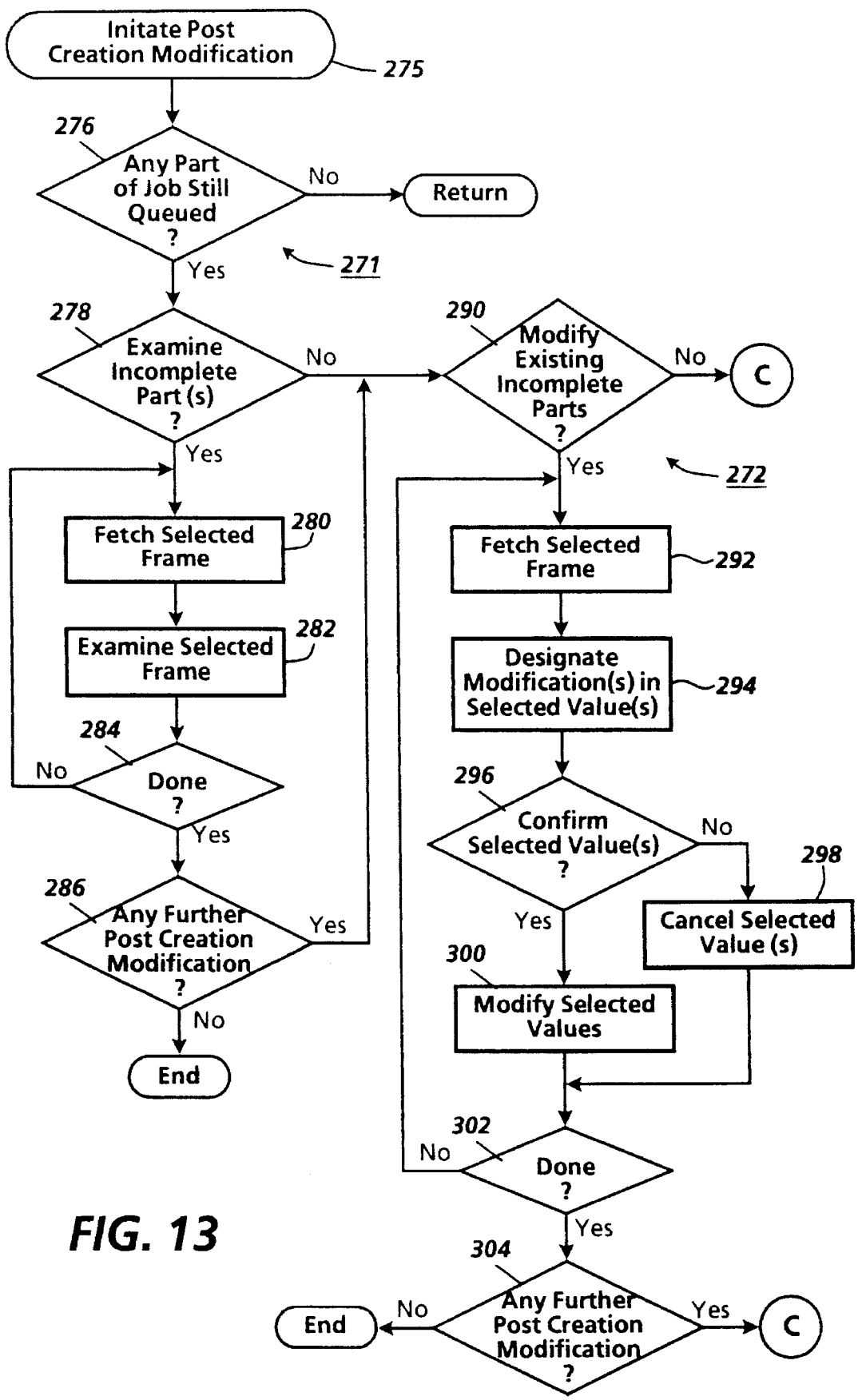
FIGS. 13 and 14 represent a flow diagram depicting various post creation modifications that can be performed on a stored composite job ticket.
Figure 14:
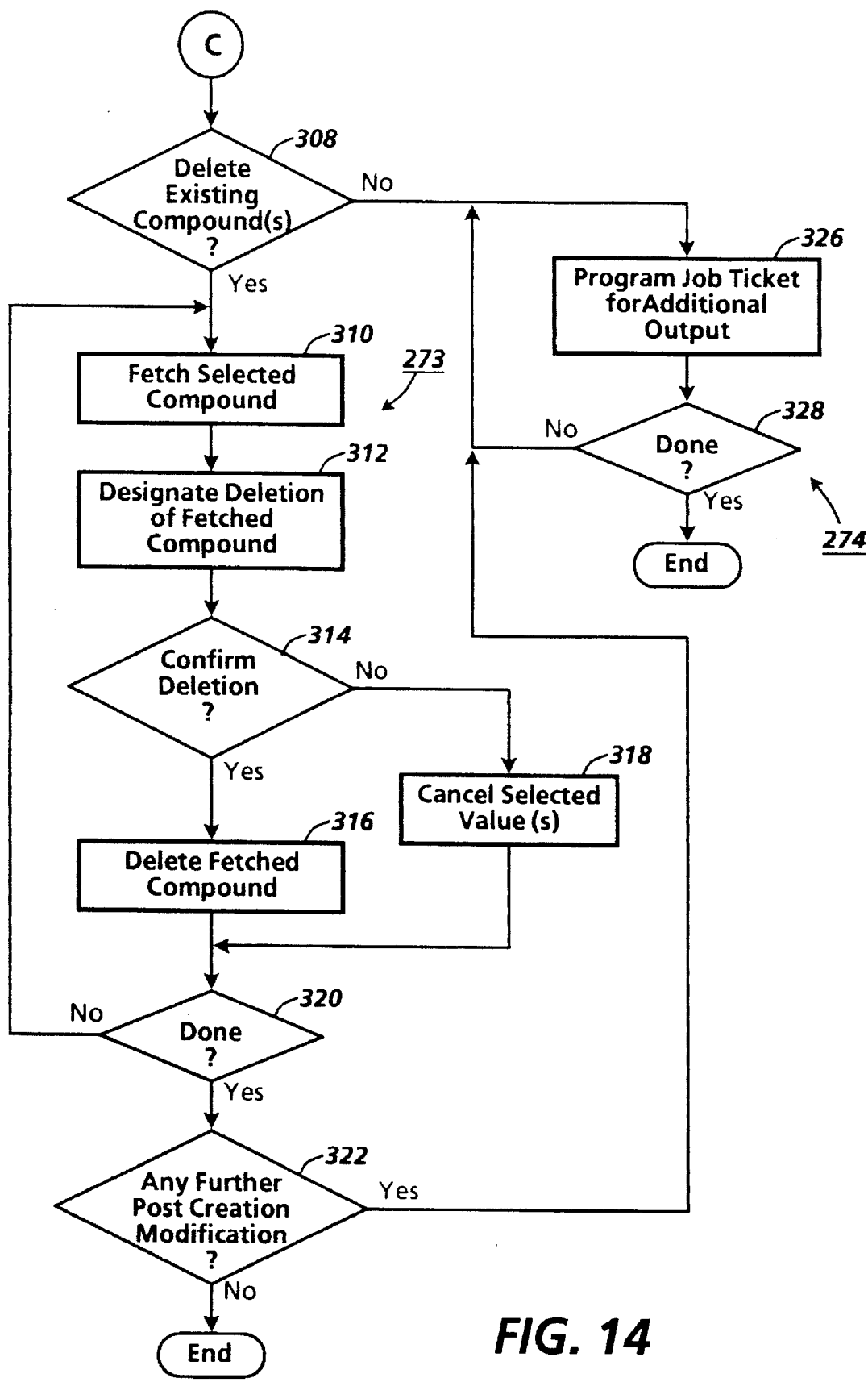

Subsequent to storing the link list of electronic tickets in memory, it may be desirable, among other things, to modify one or more of the stored tickets, delete one or more tickets, or even create another ticket. Referring to FIGS. 13 and 14, a post creation modification routine can be achieved through use of, among others, four subroutines, namely first subroutine 271, second subroutine 272, third subroutine 272 and fourth subroutine 274. In the illustrated embodiment of FIGS. 13 and 14, it is assumed that post creation modification is limited to four subroutines. It will be appreciated, however, that other modification subroutines are contemplated by the preferred embodiment.

At step 275, the post creation modification routine is initiated and, assuming that any part of the job is still queued (step 276), one of the four subroutines can be performed on that part of the job. It should be recognized that, in many examples, a job will not be maintained in memory after a designated number of copies of the job have been delivered to one or more programmed output destinations. The routine of FIG. 13 is performed for those parts of a job that still remain in memory.

At step 278, a check is performed to determine if a user desires to examine a part of the job by use of the first subroutine 271. If examination is desired, a frame, corresponding to a designated compound is fetched (step 280) and, at step 282, examined. The process may be continued through use of the decision at step 284. Once the user is finished with the first subroutine (step 286), s/he may proceed to the second subroutine or end.

If the user desires to use a subroutine other than the first subroutine (step 278) or simply proceed from the first subroutine (step 286), the process is directed to step 290. If the user desires to modify an existing part of the job, then a frame, corresponding to a designated compound is fetched (step 292) and the user, at step 294, designates a modification to be made with respect to a given value. In one example, the user may alter a previously programmed finishing or stock characteristic. Once the user has designated each value to be altered in the frame, the system, via step 296, prompts the user to confirm such designation. At that time, the user may cancel the designated values (step 298) or permit the system, at step 300, to modify the designated values. The procedure of the second subroutine may be repeated through use of decision block 302. Once the user is finished with the second subroutine (step 304), s/he may proceed to the third subroutine or end.

If the user desires to use a subroutine other than the second subroutine (step 290) or simply proceed from the second subroutine (step 304), the process is directed to step 308. Referring to FIG. 14, if the user wishes to delete an existing compound (step 310), a selected compound is fetched (step 312) and the user designates, at step 314, a corresponding deletion operation. If the user confirms deletion, at step 314, then the fetched compound is, at step 316, deleted, otherwise, the deletion designation is, at step 318, cancelled. The procedure of the third subroutine may be continued through use of the decision at step 320. Once the user is finished with the third subroutine (step 322), s/he may proceed to the fourth subroutine or end.

If the user desires to use the fourth subroutine (step 308) or simply proceed from the third subroutine (step 322), the process is directed to step 326. In the four subroutine model of FIGS. 13 and 14, it is assumed that any users accessing the fourth subroutine intend to program a job ticket for an additional output. The programming of an additional output is obtained with the steps shown in FIG. 9. Through use of decision step 328, a user may program as many additional outputs as required. As each additional electronic job ticket is generated, it is added to the link list of the preexisting composite job ticket.

Numerous features of the disclosed embodiment will be appreciated by those skilled in the art:

First, the disclosed embodiment discloses a technique for generating a composite job ticket. This technique permits a plurality of job tickets, describing multiple output/storage destinations for copies of the same job, to be stored conveniently as a single set. Storing the plurality of job tickets in this manner facilitates management of the job in that the plurality of job tickets is not dispersed throughout memory. Moreover, a composite job ticket of the sort described above is consistent with the work process of a typical printing system user. More particularly, through use of the composite job ticket the job can be programmed as one job with multiple output/storage destinations rather than as a series of jobs, each having a single output/storage destination.

Second, in the technique of the disclosed embodiment the composite job ticket need not be programmed in one programming session. For example, the user can create a set of electronic tickets at one time and store the resulting composite job ticket. Subsequently, the user can retrieve the composite job ticket and add another set of electronic job tickets to the composite job ticket. In this way, all of the sets of electronic job tickets are maintained in the same composite job ticket.

Third, the technique of the disclosed embodiment insures that the composite job ticket is internally consistent. More particularly, each set of electronic job tickets preferably includes an input designator and an output designator. The technique includes a subroutine which determines whether each one of the input designators are the same. When the input designator for one of the sets of electronic job tickets varies from other programmed input designators of the job, the user is prompted to make the choice input designators consistent.

Finally, the technique of the disclosed embodiment offers a wide variety of post creation modification options for the composite job ticket. In one example, the user can examine one or more parts of the composite job ticket in order to determine if it meets desired specifications. In another example, the user can modify preexisting parts of the composite job tickets. In yet another example, the user can delete designated compounds described by the composite job ticket. In another example, the user can program a job ticket for an additional output.

What is claimed is:

1. A method of processing a job, with an electronic composite job ticket, in a printing system with a user interface for programming the job with one or more selected inputs, the printing system being associated with a first output function executed with a first output subsystem and a second output function executed with a second output subsystem, the processing of the job being controlled by a first compound segment and a second compound segment with each compound segment corresponding with one of the one or more selected inputs and one of the first and second output functions, comprising:

(a) electronically generating a first dialog having a first set of attributes, the first set of attributes corresponding with the first compound segment and including both an input attribute subset for designating a manner In which a set of image data is to be provided pursuant to job processing and an output attribute subset for designating a manner in which a representation of the image data set is to be outputted with the first output subsystem;

(b) programming the electronically generated first dialog, with the user Interface, so that values are provided for selected ones of the set of attributes, the values including designated values for at least the input attribute subset and the output attribute subset;

(c) capturing and storing the attribute values, programmed in said step (b), to obtain a first ticket representative of the first compound segment;

(d) electronically generating a second dialog having a second set of attributes, the second set of attributes corresponding with the second compound segment and including both a second input attribute subset for designating a manner in which a second set of image data is to be provided pursuant to job processing and a second output attribute subset for designating a manner, in which a representation of the second set of image data is to be outputted with the second output subsystem;

(e) programming the electronically generated second dialog, with the user interface, so that values are provided for selected ones of the second set of attributes, the values for selected ones of the second set of attributes including designated values for at least the input attribute subset and the second output attribute subset;

(f) capturing and storing the attribute values, programmed in said step (e), to obtain a second ticket representative of the second compound segment;

(g) linking the first and second tickets to create the electronic composite job ticket; and (h) subsequent to executing said step (g), processing both the first compound segment and the second compound segment, in accordance with the electronic composite job ticket, so that a copy of the set of image data is delivered to the first output subsystem for outputting of the representation of the set of image data at a first time and a copy of the second set of image data is delivered to the second output function for outputting of the representation of the second set of image data at a second time, wherein the second output function performed with the second output subsystem is distinct with respect to the first output function performed with the second output subsystem.

2. The method of claim 1, further comprising the step of modifying one of the attributes values of the composite job ticket.

3. The method of claim 1, further comprising the step of deleting one of the first compound segment and the second compound segment.

4. The method of claim 1, further comprising the step of determining whether a selected value of the input attribute subset of the set of attributes is the same as a selected value of the input attribute subset of the second set of attributes.

5. The method of claim 4, further comprising prohibiting execution of said step (h) unless the selected value of the input attribute subset of the set of attributes is the same as the selected value of the input attribute subset of the second set of attributes.

6. The method of claim 1, wherein said step (g) includes linking the first and second tickets with a reference in a link list.

7. The method of claim 1, in which the first and second output subsystems are disposed in a common document processing apparatus, wherein said step (h) includes executing the first and second output functions in the common document processing apparatus.

8. The method of claim 1, in which the first ticket includes a programmed attribute value relating to a stock characteristic or a finishing option and the second ticket includes a programmed attribute value relating to a stock characteristic or a finishing option, wherein step (e) includes programming the attribute value relating to the stock characteristic or finishing option of the second compound to be different than the stock characteristic or finishing option for the first compound.

9. The method of claim 1, wherein said step (h) includes generating an electronic document and outputting a copy of a representation of the electronic document at the first output subsystem in accordance with the composite job ticket and outputting a second copy of the representation of the electronic document at the second output subsystem.

10. The method of claim 9, in which the first output subsystem communicates with a memory, further comprising the step of storing the copy of the electronic document in the memory.

* * * * *